United States Patent [19]

Nakajima

[11] Patent Number: 5,339,444
[45] Date of Patent: Aug. 16, 1994

[54] PORTABLE COMPUTER RESETTING RESUME ERROR CAUSED FROM HDD LOADED CONDITION BEING CHANGED AND STARTING OS

[75] Inventor: Shuzo Nakajima, Tokyo, Japan

[73] Assignee: Kabushiki Kaisha Toshiba, Kawasaki, Japan

[21] Appl. No.: 781,906

[22] Filed: Oct. 24, 1991

[30] Foreign Application Priority Data

Nov. 27, 1990 [JP] Japan .................................. 2-324300

[51] Int. Cl.$^5$ .......................... G06F 11/30; G06F 1/00
[52] U.S. Cl. ..................................... 395/750; 395/575; 364/DIG. 2; 364/927; 364/943.9; 364/946.1; 364/948.4; 364/975.2; 364/948.2
[58] Field of Search ........................ 395/750, 500, 575; 371/66; 364/707

[56] References Cited

U.S. PATENT DOCUMENTS

| | | | |
|---|---|---|---|
| 4,654,818 | 3/1987 | Wetterau, Jr. .................. | 364/704 X |
| 4,907,150 | 3/1990 | Arroyo et al. ..................... | 395/575 |
| 5,021,983 | 6/1991 | Nguyen et al. ..................... | 364/707 |
| 5,041,964 | 8/1991 | Cole et al. ..................... | 395/425 |
| 5,107,400 | 4/1992 | Kobayashi ..................... | 361/392 |
| 5,151,992 | 9/1992 | Nagae ..................... | 395/750 |
| 5,163,153 | 11/1992 | Cole et al. ..................... | 395/750 |
| 5,167,024 | 11/1992 | Smith et al. ..................... | 395/375 |
| 5,212,633 | 5/1993 | Franzmeier ..................... | 395/500 |
| 5,218,607 | 6/1993 | Saito et al. ..................... | 371/66 |
| 5,222,239 | 6/1993 | Rosch ..................... | 395/750 |
| 5,230,055 | 7/1993 | Katz et al. ..................... | 395/750 |
| 5,230,074 | 7/1993 | Canova, Jr. et al. ................ | 395/750 |
| 5,276,890 | 1/1994 | Arai ..................... | 395/750 |

OTHER PUBLICATIONS

UK Patent Application GB 2 223 116A (British Airways PTC) Mar. 28, 1990.
Eaton, John T., et al., "Design of HP's Portable Computer Family," *Hewlett-Packard Journal*, vol. 32 No. 7, Jul. 1986, pp. 4–13.

*Primary Examiner*—Paul V. Kulik
*Attorney, Agent, or Firm*—Finnegan, Henderson, Farabow, Garrett & Dunner

[57] ABSTRACT

In a portable computer having an external-memory loading/unloading mechanism and a resume function, presence or absence of change of the loaded condition of a hard disk pack is determined while the portable computer is in a resume mode when the portable computer is powered. If the condition has changed, a resume error is displayed, instructing an operator to continue operation, ignoring the resume error, or to perform the operation from the beginning. If the operator continues the operation, a drive designation of the computer is changed. When the power of the portable computer is cut off, the ID data identifying a hard disk pack is written into the pack and also a backup RAM. When the portable computer is powered, the ID data is read from the pack and compared with the ID data stored in the backup RAM. If the ID data items compared are identical, the resume function is performed, thereby preventing the hanging up of the system.

16 Claims, 5 Drawing Sheets

PORTABLE COMPUTER RESETTING RESUME ERROR CAUSED FROM HDD LOADED CONDITION BEING CHANGED AND STARTING OS

BACKGROUND OF THE INVENTION

1. Field of the Invention

The present invention relates to a portable computer having a hard disk loading/unloading mechanism and capable of performing a resume function, and more particularly to a portable computer that is free of inconvenience resulting from changes in the loaded condition of the hard disk.

2. Description of the Related Art

In recent years, various portable and battery-driven lap-top computers have been developed. A portable computer of this type should be smaller and lighter and have greater data storage, so that it may be more useful. To meet this demand, it has been proposed that a hard-disk pack be added to the computer to provide sufficient data storage. The hard-disk pack should be detachable from the computer so that the computer is light enough to carry. Such a computer should also be able to perform a so-called "resume function" so that the user can resume work on the computer that was done before turning off the power switch, merely by turning the power switch on again.

A portable computer capable of performing the resume function and having a hard disk loading/unloading mechanism, in order to meet all the demands described above, has several drawbacks.

If for example, the computer is set in the resume mode, and no hard-disk pack is set in the computer and the user first turns off the power switch, then sets a hard-disk pack in the computer, and finally turns on the power switch, the hard disk will not be accessible. Consequently, the user cannot perform the task he or she wants to do, such as executing an application program installed in the hard-disk pack.

If the user turns off the power switch, removes the hard-disk pack from the computer, and turns on the power switch, the hard disk will not be accessible. Consequently, it is impossible to activate the operating system (OS) program stored in the hard disk.

SUMMARY OF THE INVENTION

The object of the invention is to provide a portable computer having a hard disk loading/unloading mechanism and capable of performing a resume function, which can activate the operating system (OS) even if the loaded condition of the hard-disk pack changes while the computer is set in the resume mode.

According to a first aspect of the present invention, there is provided a portable computer having an external-memory loading/unloading mechanism, and capable of performing resume function, which comprises: determining means for determining presence or absence of change of loaded condition of an external memory when the portable computer is powered while the computer is set in resume mode; display means for displaying data indicating a resume error when said determining means determines that the loaded condition of said external memory has changed; and means for forcibly resetting the resume function and performing an setup process.

According to a second aspect of the present invention, there is provided a portable computer having an external-memory loading/unloading mechanism, and capable of performing resume function, which comprises: determining means for determining presence or absence of change of loaded condition of an external memory when the portable computer is powered while the computer is set in resume mode; means for changing a drive designation of the computer when the determining means determines that the loaded condition of the external memory has changed; and means for forcibly resetting the resume function and performing a setup process.

According to a third aspect of the present invention, there is provided a portable computer having an external-memory loading/unloading mechanism, and capable of performing resume function, which comprises: determining means for determining presence or absence of change of loaded condition of an external memory when the portable computer is powered while the computer is set in resume mode; display means for displaying data indicating a resume error when the determining means determines that the loaded condition of the external memory has changed; means for changing a drive designation of the computer when the detection means detects that the loaded condition of the external memory has changed; and means for forcibly resetting the resume function and performing a setup process.

According to a fourth aspect of the present invention, there is provided a portable computer having an external-memory loading/unloading mechanism, and capable of performing resume function, which comprises: determining means for determining presence or absence of change of loaded condition of an external memory when the portable computer is powered while the computer is set in resume mode; means for displaying data indicating a resume error when the determining means determines that the loaded condition of the external memory has changed, and for instructing an operator to continue operation, ignoring the resume error, or to perform the operation from the beginning; and means for forcibly resetting the resume function when the operator continues the operation, and for stopping the supply of power to the computer when the operator performs the operation from the beginning.

According to the present invention, a specific I/O port assigned to an hard-disk drive (HDD) is read, thereby determining whether or not the HDD is loaded in the portable computer when powered while the computer is set in the resume mode. A message indicating a resume error is displayed to urge an operator to select to continue operation, ignoring the resume error, or to perform the setup process again in the following cases.

i) The HDD has not been loaded when the power of the portable computer has been cut off but is loaded when the portable computer is powered.

ii) The HDD has been loaded when the power of the portable computer has been cut off but is not loaded when the computer is powered.

iii) The HDD that has been loaded when the power of the portable computer has been cut off is different from the HDD that is loaded when the portable computer is powered. If the operator continues the operation, the resume data is cleared in the backup RAM incorporated in the portable computer, the drive designation is changed, and the OS is started.

According to the present invention, in order to determine whether or not the loaded HDD when the power of the portable computer is cut off is identical to that when the computer is powered, the following operations are performed.

The ID data for identifying the hard disk pack is written in the hard disk pack and also in the backup memory when the power of the portable computer is cut off while it is set in the resume mode. When the portable computer is powered on, the ID data is read from the loaded hard disk pack and compared with the ID data stored in the backup memory. If no coincidence is obtained, it is determined that the resume error has occurred.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

An embodiment of the present invention will be described, with reference to the accompanying drawings.

Figure 1:
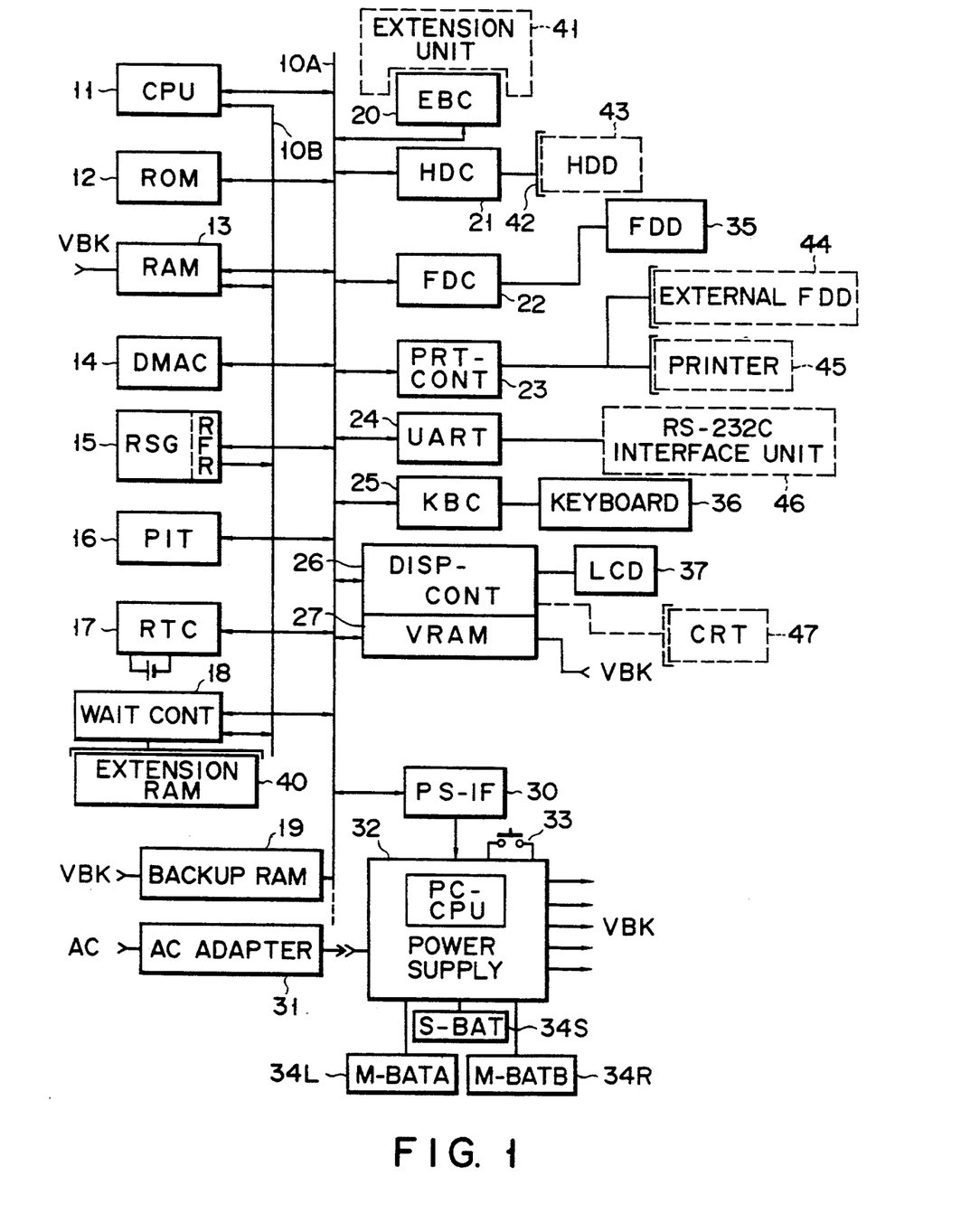
FIG. 1 is a system block diagram showing a portable computer according to the present invention.

FIG. 1 is a block diagram schematically showing a portable computer according to the invention. As is shown in this figure, the portable computer has a system bus 10A, an internal bus 10B, and various components 11 to 27 and 30 connected to the system bus 10A. Of these components, the CPU (main CPU) 11 controls the entire system. The CPU 11 accesses a BIOS-ROM 12 when the portable computer is powered and executes the process shown in FIG. 2 when the power of the computer is cut off and the process shown in FIGS. 3A-3C when the computer is powered. The BIOS-ROM 12 stores the programs shown in FIGS. 2 and 3A-3C.

A RAM 13 serves as a main memory which stores application programs, data to be processed, and the like. The DMA controller (DMAC) 14 performs a direct memory access control.

A refresh signal generator (RSG) 15 generates refresh signal for a memory refresh. The generator 15 selectively outputs memory refresh signals onto the system bus 10A or the internal bus 10B, in accordance with the content of the control bit (C) stored in the refresh control register RFR connected to the refresh signal generator 15.

A programmable interval timer (PIT) 16 includes a programmable interrupt controller (PIC). The real time clock (RTC) module 17 incorporates a dedicated drive battery and stores date data, time data, system control data, and the like, which are all need to be stored at all times.

A wait controller 18 switches the wait time determining the read/write cycle time in accordance with the type of the extension RAM 40 set in the dedicated slot of the computer main body to control the access to the extension RAM 40. (In this embodiment, the RAM 40 can be a low-speed 1 MB- or 2 MB-memory card of a conventional type, or a high-speed 4 MB- or 8 MB-memory card of a new type.)

A backup RAM 19 is backed up by a backup power VBK and serves as a data save area for executing the resume function. In this embodiment, in order to confirm whether or not the HDD when the power of the portable computer is cut off is identical with the HDD when the computer is powered, the ID data identifying the HDD is written in the HDD and also in the backup RAM 19.

An extension bus connector (EBC) 20 connects to the system bus 10A to various extension optional devices such as an extension memory board, a communication board, and the like mounted on an extension unit 41.

The hard disk controller (HDC) 21 interface-connects a hard disk pack 43 to be loaded in the computer main body for the system grade up (one HDD and one FDD are mounted) through an internal connector 42 provided in a hard disk housing section. A floppy disk controller (FDC) 22 controls a floppy disk drive (FDD) 35 incorporated in the computer.

A printer controller (PRT-CONT) 23 is connected to an external 5-inch floppy disk drive 44 or a printer 45. A universal asynchronous receiver/transmitter (UART) 24 is connected to an RS-232C interface unit 46 or the like as it is necessary.

A keyboard controller (KBC) 25 controls the data input from a keyboard 36 that is formed integrally with the main body of the portable computer. A display controller (DISP-CONT) 26 is built into the display frame hinged to the main body of the computer, and controls the back-lighted (or side-lighted) liquid crystal display (LCD) 37. The display controller 26 can control an external display such as a CRT display 47.

A video RAM (VRAM) 27 is backed up by a backup power supply VBK.

A power-supply control interface (PS-IF) 30 connects an intelligent power supply 32 to the CPU 11 through the system bus 10A. The interface 30 can perform a serial-to-parallel conversion in order to transfer data serially between the CPU 11 and the power control CPU (PC-CPU) incorporated in the power supply 32. A power supply adapter "AC adapter) 31 is plugged into the main body of the computer, to rectify and smooth the AC current supplied from a commercially available AC source, thus functioning as a DC current source of a predetermined potential. A power switch 33 is used to supply and cut off the power to the portable computer.

Two main battery packs (M-BATA, M-BATB) 34L and 34R are both chargeable and detachable. In this embodiment, any one of the battery packs is used as the power source under the control of the power supply circuit 30. When the selected main battery is nearly used up, the other main battery is used. Further, a sub-battery 34S, which is chargeable and incorporated in the computer main body, functions as a backup power supply (VBK) for the memories that need to keep storing data, such as the RAM 13, the extension RAM 40, and the video RAM 27.

An extension RAM 40 is insertable in a dedicated slot of the portable computer main body. The extension RAM 40 may be of a 1 MB- or 2 MB-memory card of the known type. Alternatively, it may be of a 4 MB- or 8 MB-memory card of new type. In other words, a memory card of one of four types is inserted in the slot. The memory cards of the new type (i.e., the 4 MB-card and the 8 MB-card) require an access time different from that of the memory cards of the known type (i.e., the 1 MB-card and the 2 MB-card). To be precise, the wait time of the 1 MB- and 2 MB-memory cards is twice as long as that of the 4 MB- and 8 MB-memory cards. In order to provide an interface applicable to both types of memory cards, the wait controller 18 switches the wait time from wait time 1 to wait time 2, or vice versa, in accordance with the type of the RAM 40 (i.e., the memory card). Any designated storage area of the extension RAM 40 (i.e., a memory card) is used as a hard RAM (H.RAM).

The extension unit 41 is selectively connected to the extension bus connector (EBC) 20 and is mounted with various optional devices such as an extension memory board, a communication board, and the like. The internal connector 42 interface-connects the hard disk pack 43 to be loaded in the computer main body in order to grade up the system to a hard disk mount type (one HDD and one FDD.) The hard disk pack 43 is interfaced through the connector 42.

Figure 2:
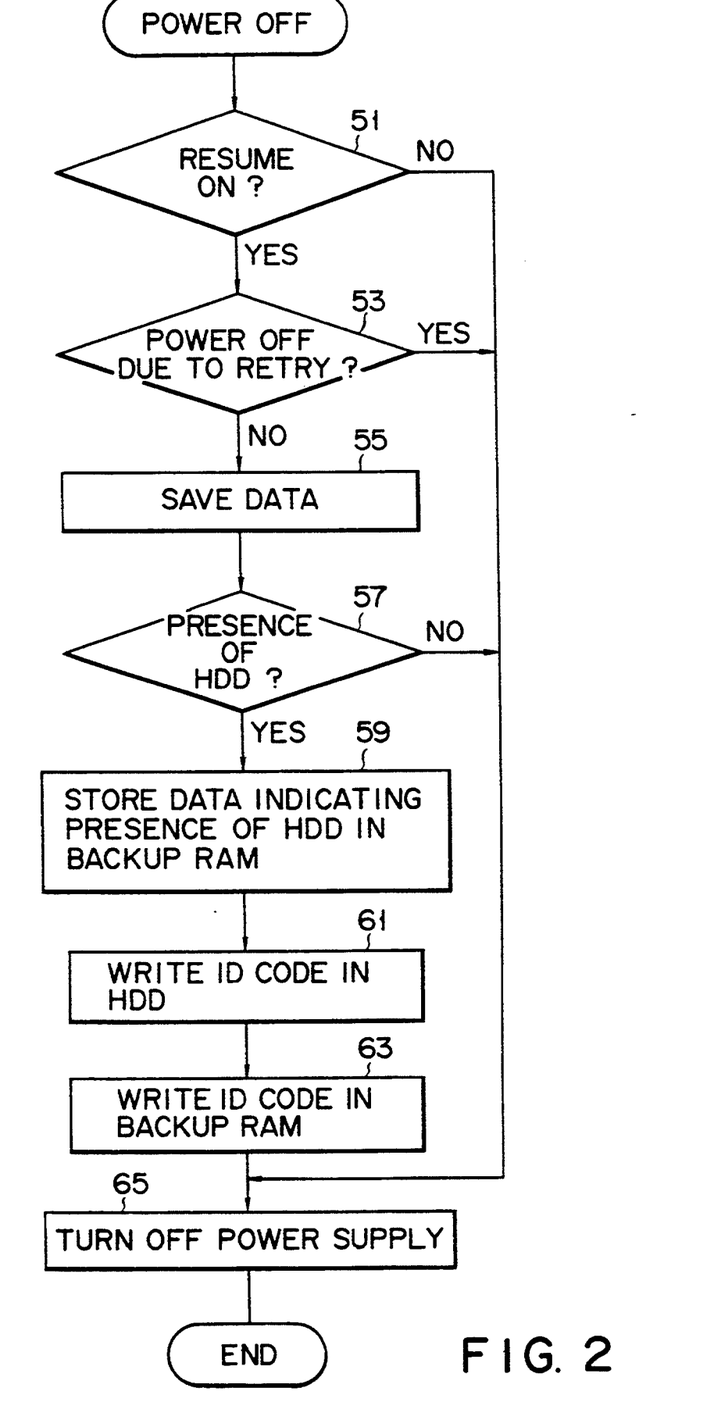
FIG. 2 is a flow chart illustrating the operation performed while the power of the computer is cut off.

FIG. 2 is a flow chart showing a process when the power of the portable computer shown in FIG. 1 is cut off.

First, in step 51, the CPU 11 determines whether or not the resume mode is set. The resume mode is set in the set up process to be performed when the portable computer is powered or in a set up window in the following processes. If the CPU 11 determines in step 51 that the resume mode is not set, it turns off the power supply circuit 32 in step 65.

If the resume mode is set in step 51, the CPU 11 determines in step 53 whether the cutoff of the power is due to the retry mode. (The retry mode will be described in the power on process routine shown in FIGS. 3A through 3C.) If the power cutoff is due to the retry mode, CPU 11 turns off the power supply circuit 32 in step 65.

If a determination of NO is made in step 53, that is, if the power supply is not off due to the retry mode, the CPU 11 stores in step 55 the current values of the registers, the display data, the processed results, and the like, into the backup RAM 19. In the next step 57, the CPU 11 determines whether or not the hard disk pack 43 is connected to the internal connector 42. The hard disk pack 43 is regarded as connected to the connector 42 if a specific code is read from the I/O port assigned to the hard disk controller 21. Alternatively, the hard disk pack 43 can be regarded as connected to the connector 42 if a specified one of the pins of the connector 42 is set at a predetermined potential.

If a determination of YES is made in step 57, that is, if the pack 43 is connected to the connector 42, the CPU 11 stores into the backup RAM 19 indicating that the hard disk pack 43 has been connected when the power of the portable computer has been cut off. Then, in step 61, the CPU 11 writes the ID code of the loaded hard disk pack 43, in a specified region of the hard disk pack 43, for example on the C track which is used by a system side. In step 63, the CPU 11 writes the ID code into the backup RAM 19. In step 65, the CPU 11 turns off the intelligent power supply 32.

Figure 3A:
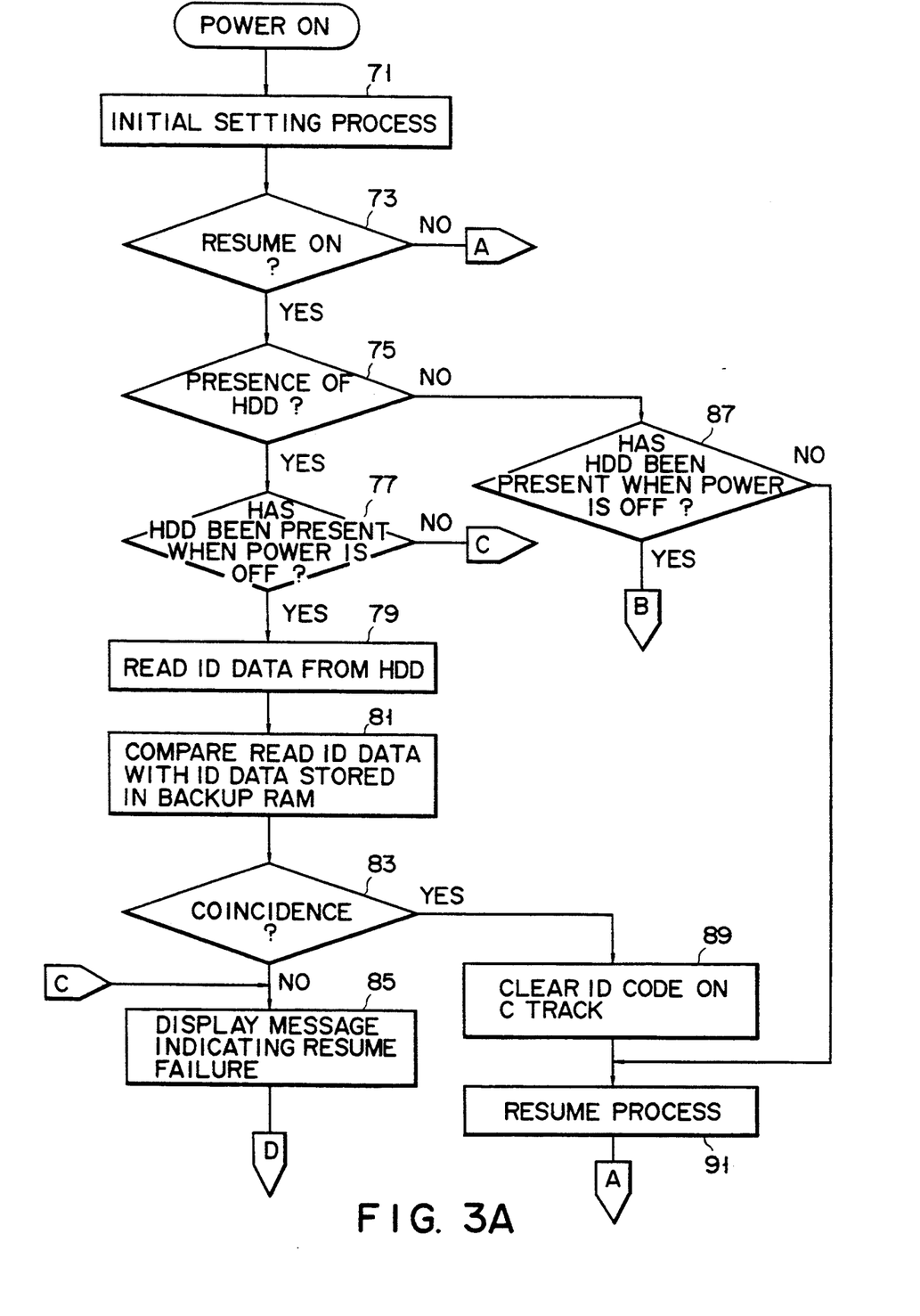
FIGS. 3A, 3B, and 3C show a flow chart explaining the operation performed while the computer is powered.
Figure 3B:
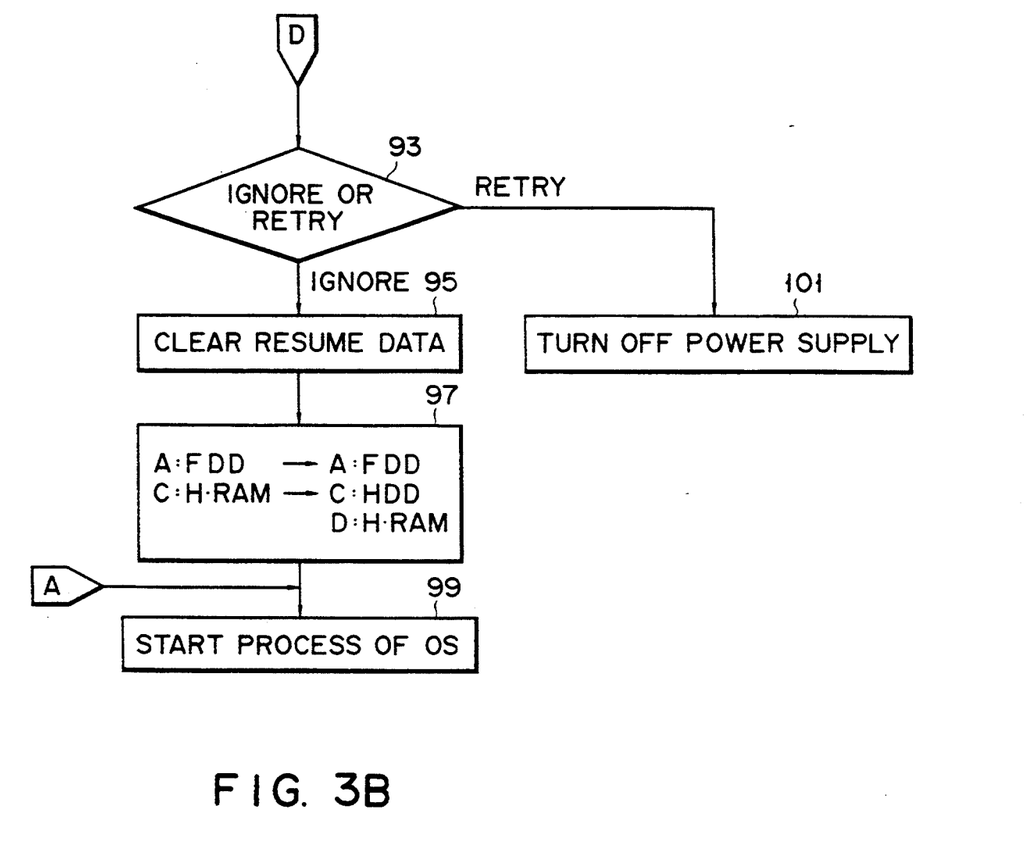
Figure 3C:
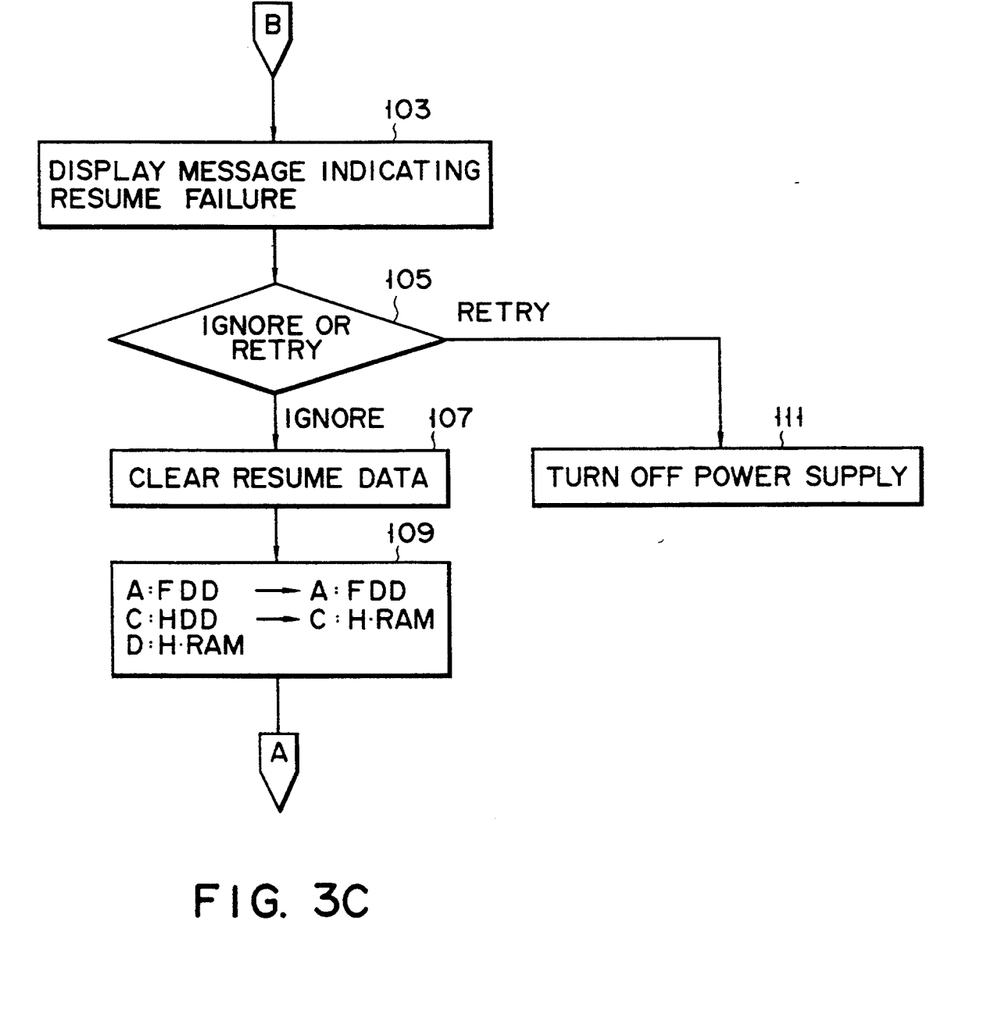

With reference to FIGS. 3A through 3C, the process when the portable computer is powered will now be described.

When the power switch 33 is activated while the power of the portable computer is cut off, the power supply circuit 32 is turned on to supply a power to the computer. The CPU 11 makes an access to the BIOS-ROM 12, and then performs the set up process as shown in FIGS. 3A through FIG. 3C.

First, in step 71, the CPU 11 executes initial setting process in response to the supplement of power to the computer. Next, in step 73, the CPU 11 determines whether or not the resume mode has been set. If not the CPU 11 starts the operating system (OS) program in step 99.

If a determination of YES is made in step 73, that is, if the resume mode has been set, the CPU 11 determines in step 75 whether or not the hard disk pack 43 is connected to the internal connector 42. If so, the CPU 11 reads the data stored in the backup RAM 19, in step 77, thereby determining whether or not the pack 43 has been connected to the connector 42 when the power is cut off. If the pack has been connected, the CPU 11 reads, in step 79, the ID data recorded in the hard disk pack 43. In the next step 81, the CPU 11 compares the ID data from the pack 43 with the ID data stored in the backup RAM 19. In step 83, the CPU 11 determines whether the ID data items compared are identical or not. If so, the CPU 11 clears, in step 89, the ID data recorded on the C track Of the hard disk pack 43. Then, in step 91, the CPU 11 performs the resume function. In other words, the CPU 11 restores the resume data which has been saved in the backup RAM 19 when the power of the computer is cut off. After completing the resume process, the CPU 11 starts the operating system (OS) program in step 99.

If it is determined in step 77 that the hard disk pack 43 has not been connected to the connector 42 when the power of the portable computer is cut off, the CPU 11 recognizes that the hard disk pack 43 is loaded after the power is cut off and before the portable computer is powered. In this case, the CPU 11, in step 93, causes the liquid crystal display (LCD) 37 to display a resume error message and a message urging an operator to select ignore mode in order to continue operation, ignoring the resume error, or the retry mode in order to set up the system. If the operator selects the ignore mode, the CPU 11 clears the resume data in the backup RAM 19, in step 95. Then, in step 97, the CPU 11 switches the drive designation. More specifically, the CPU 11 assigns the A drive to the FDD, the C drive to the hard disk pack 43, and the D drive to the hard RAM 40, though the A drive and the C drive were assigned to the FDD and the hard RAM 40, respectively, when the power of the portable computer was cut off.

If the operator selects the retry mode in step 93, the CPU 11 turns off the intelligent power supply 32.

If it is determined in step 75 that the hard disk pack 43 is not connected to the internal connector 42, the CPU 11 in step 87 reads the data stored in the backup RAM 19 and determines whether or not the hard disk pack 43 was connected to the connector 42 when the power was cut off. If it is determined that the hard disk pack 43 was not connected to the connector 42, the CPU 11 determines that the hard disk pack 43 has not been loaded not only when the power was cut off but also when the portable computer was powered. Thus, if a determination of NO is made in step 87, the CPU 11 in step 91 performs the resume function and in step 99 starts the OS program.

If it is determined in step 87 that the pack 43 was connected to the connector 42 when the power was cut off, it is determined that the hard disk pack 43 was removed from the connector 42 after the power was cut off. In this case, the CPU 11 causes the liquid crystal display 37 to display a resume error message in step 103 and a message urging the an operator to select ignore mode in order to continue operation, ignoring the resume error, or the retry mode in order to execute the set up process again. If the operator selects the ignore mode (see step 105), the CPU 11 clears in step 107 the resume data saved in the backup RAM 19 when the power was cut off. Then, in step 109, the CPU 11 changes the drive designation. More specifically, when the power was cut off, the FDD 35, the HDD 43, and the hard RAM 40 were assigned to the A, C, and D drives, respectively. This time, the CPU 11 assigns the FDD 35 and the hard RAM 40 to the A and C drives, respectively. Then, the CPU 11 starts the OS in step 99. As a result, the CPU 11 reads the OS from the hard RAM 40 and loads it into the main memory 13 for execution.

If the operator selects the retry mode in step 93, the CPU 11 turns off the intelligent power supply 32.

As can be understood from the above, the presence or absence of change of the loaded conditions of the hard disk pack is determined for four cases and respective different proceedings are performed depending on which of the four cases occurs. Accordingly, a process can be continued even in the case of a resume error without the system being hung up.

More specifically:

i) If the hard disk pack 43, which was not connected to the connector 42 when the power was cut off, is connected to the connector 42 when the computer is powered, the liquid crystal display 37 displays an resume error message, urging an operator to select ignore mode or the retry mode. If the operator selects the ignore mode, the CPU 11 clears the resume data, changes the drive designation (in this case, the hard disk pack 43 is designated to the C drive) and starts the OS program.

ii) If the hard disk pack 43 was connected to the connector 42 not only when the power was cut off, but also when the computer was powered, the CPU 11 reads the ID data from the hard disk pack 43, and compares this ID data with the ID data saved when the power was cut off. If the ID data items compared are identical, the CPU 11 erases the ID data from the hard disk pack 43, and performs the resume function. If the ID data items are not identical, the CPU 11 causes the display 37 to display a resume error message and a message urging the operator to select the ignore mode or the retry mode. If the operator selects the ignore mode, the CPU 11 erases the resume data from the backup RAM 19 and starts the OS program.

iii) If the hard disk pack 43, which was connected to the connector 42 when the power was cut off, is not connected to the connector 42 when the computer is powered, the liquid crystal display 37 displays a resume error message and a message urging an operator to select the ignore mode or the retry mode. If the operator selects the ignore mode, the CPU 11 changes the drive designation (in this case the hard RAM 40 is assigned to the C drive) and then starts the OS program.

iv) If the hard disk pack 43 was not connected to the connector 42 not only when the power was cut off, but also when the computer was powered, the CPU 11 performs the conventional resume function, and starts the OS program.

In the embodiment described above, a hard disk drive is exemplified as an external memory that can be detached from the computer. Nonetheless, the present invention is not limited to the above embodiment. For instance, an extension memory card can be used as external memory.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method for controlling a portable computer having an external-memory loading/unloading mechanism, and capable of performing a resume function, the method comprising the steps of:

determining presence or absence of change of a loaded condition of an external memory, when the portable computer is powered while the computer is set in a resume mode;

displaying data indicating a resume error when it is determined that the loaded condition of said external memory has changed; and executing one of, in response to an external command, ignoring the resume mode and performing a setup process.

2. A method for controlling a portable computer having an external-memory loading/unloading mechanism, and capable of performing a resume function, the method comprising the steps of:

determining presence or absence of change of loaded condition of an external memory, when the portable computer is powered while the computer is set in a resume mode;

changing a drive designation of the computer when it is determined that the loaded condition of the external memory has changed; and executing one of, in response to an external con, hand, ignoring the resume mode and performing a setup process.

3. A method for controlling a portable computer having an external-memory loading/unloading mechanism, and capable of performing a resume function, the method comprising the steps of:

determining presence or absence of change of a loaded condition of an external memory, when the portable computer is powered while the computer is set in a resume mode;

displaying data indicating a resume error when it is determined that the loaded condition of the external memory has changed;

changing a drive designation of the computer when it is determined that the loaded condition of the external memory has changed; and executing one of, in response to an external command, ignoring the resume mode and performing a setup process.

4. A method for controlling a portable computer having an external-memory loading/unloading mechanism, and capable of performing a resume function, the method comprising the steps of:
- determining presence or absence of change of a loaded condition of an external memory, when the portable computer is powered while the computer is set in a resume mode;
- displaying data indicating a resume error when it is determined that the loaded condition of the external memory has changed;
- instructing an operator to continue an operation ignoring the resume error, or to perform the operation from the beginning; and
- ignoring the resume mode when the operator continues the operation, and for stopping the supply of power to the computer when the operator performs the operation from the beginning.

5. The method according to claim 4, further comprising the steps of:
- writing ID data identifying the external memory, into the external memory and also into an internal memory, when the portable computer is powered while the portable computer is set in the resume mode;
- reading the ID data from the external memory when the portable computer is powered, and for comparing the ID data with the ID data stored in the internal memory; and
- determining a resume error when the ID data read from the external memory is different from the ID data stored in the internal memory.

6. A method for controlling a portable computer having a removably connectable device and a resume function, the method comprising the steps of:
- detecting a change of loaded condition of the removably connectable device when the computer is powered while being set in a resume mode;
- displaying data indicating a resume failure in response to the detection; and
- urging an operator to select either a first mode in which the resume function is disabled and the operation is continued or a second mode in which the computer is powered off and the operator sets up the computer again.

7. The method according to claim 6, further comprising the step of changing a drive designation of the computer when the change of the loaded condition of the removably connectable device is detected and the operator selects the first mode.

8. The method according to claim 6, further comprising the steps of:
- writing ID data identifying the removably connectable device into a memory and the removably connectable device when the computer is powered off while being set in the resume mode;
- reading the ID data from the removably connectable device when the computer is powered, and for comparing the read ID data with the ID data stored in the memory; and
- determining the resume failure when the read ID data is not coincident with the stored ID data.

9. A portable computer having an external-memory loading/unloading mechanism, and capable of performing a resume function, the computer comprising:
- determining means for determining presence or absence of change of a loaded condition of an external memory when the portable computer is powered while the computer is set in a resume mode;
- display means for displaying data indicating a resume error when said determining means determines that the loaded condition of said external memory has changed; and
- means for, in response to an external command, executing one of ignoring the resume mode and performing a setup process.

10. A portable computer having an external-memory loading/unloading mechanism, and capable of performing a resume function, the computer comprising:
- determining means for determining presence or absence of change of a loaded condition of an external memory when the portable computer is powered while the computer is set in a resume mode;
- means for changing a drive designation of the computer when the determining means determines that the loaded condition of the external memory has changed; and
- means for, in response to an external command, executing one of ignoring the resume mode and performing a setup process.

11. A portable computer having an external-memory loading/unloading mechanism, and capable of performing a resume function, the computer comprising:
- determining means for determining presence or absence of change of a loaded condition of an external memory when the portable computer is powered while the computer is set in a resume mode;
- display means for displaying data indicating a resume error when the determining means determines that the loaded condition of the external memory has changed;
- means for changing a drive designation of the computer when the determining means determines that the loaded condition of the external memory has changed; and
- means for, in response to an external command, executing one of ignoring the resume mode and performing a setup process.

12. A portable computer having an external-memory loading/unloading mechanism, and capable of performing a resume function, said computer comprising:
- determining means for determining presence or absence of change of a loaded condition of an external memory when the portable computer is powered while the computer is set in a resume mode;
- means for displaying data indicating a resume error when the determining means determines that the loaded condition of the external memory has changed, and for instructing an operator to continue an operation, ignoring the resume error, or to perform the operation from the beginning; and
- means for ignoring the resume mode when the operator continues the operation, and for stopping the supply of power to the computer when the operator performs the operation from the beginning.

13. The portable computer according to claim 12, further comprising:
- a memory;
- ID data writing means for writing ID data identifying the external memory, into the external memory and also into the memory, when power of the portable computer is cut off while the computer is set in the resume mode;
- ID data comparing means for reading the ID data from the external memory when the portable computer is powered, and for comparing the ID data with the ID data stored in the memory; and means for determining a resume error when the ID data read from the external memory is different from the ID data stored in the memory.

14. A portable computer having a removably connectable device and a resume function, comprising:
   detection means for detecting a change of a loaded condition of the removably connectable device when the computer is powered while being set in a resume mode;
   display means for displaying data indicating a resume failure in response to the detection by the detection means; and
   means for urging an operator to select either a first mode in which the resume function is disabled and the operation is continued or a second mode in which the computer is powered off and the operator sets up the computer again.

15. The computer according to claim 14, further comprising means for changing a drive designation of the computer when the detection means detects the change of the loaded condition of the removably connectable device and the operator selects the first mode.

16. The portable computer according to claim 14, further comprising:
   a memory;
   ID data writing means for writing ID data identifying the removably connectable device into the memory and the removably connectable device when the computer is powered off while being set in the resume mode;
   ID data comparing means for reading the ID data from the removably connectable device when the computer is powered, and for comparing the read ID data with the ID data stored in the memory; and
   means for determining the resume failure when the read ID data is not coincident with the stored ID data.

* * * * *